United States Patent [19]

Finke et al.

[11] Patent Number: 4,952,662

[45] Date of Patent: Aug. 28, 1990

[54] MOLDING COMPOUNDS COMPRISING A THERMOPLASTICALLY PROCESSIBLE, AROMATIC POLYAMIDE

[75] Inventors: Juergen Finke, Marl; Martin Bartmann, Reckinghausen; Joachim Muegge, Haltern; Friedrich-Georg Schmidt, Munster, all of Fed. Rep. of Germany

[73] Assignee: Huels Aktiengaellscaft, Marl, Fed. Rep. of Germany

[21] Appl. No.: 302,616

[22] Filed: Jan. 27, 1989

[30] Foreign Application Priority Data

Feb. 12, 1988 [DE] Fed. Rep. of Germany ......... 380401

[51] Int. Cl.$^5$ ...................... C08G 73/14; C08G 79/08
[52] U.S. Cl. .................................. 528/182; 524/226; 524/230; 524/233; 524/606; 528/173; 528/184; 528/185

[58] Field of Search ............... 528/173, 182, 184, 185; 524/226, 230, 233, 606

[56] References Cited

FOREIGN PATENT DOCUMENTS

| 1933212 | 1/1971 | Fed. Rep. of Germany . |
| 56-40249 | 4/1981 | Japan . |
| 57-180633 | 11/1982 | Japan . |
| 62-209137 | 9/1987 | Japan . |
| 63-27527 | 2/1988 | Japan . |

*Primary Examiner*—Harold D. Anderson
*Assistant Examiner*—T. Mosley
*Attorney, Agent, or Firm*—Oblon, Spivak, McClelland, Maier & Neustadt

[57] ABSTRACT

Molding compounds comprisign aromatic polyamides which contain from 0.01 to 10 mole % of a low molecular weight carboxylic acid amide display low melt viscosities and an increased resistance to hydrolysis and are thermoplastically processible.

15 Claims, No Drawings

MOLDING COMPOUNDS COMPRISING A THERMOPLASTICALLY PROCESSIBLE, AROMATIC POLYAMIDE

BACKGROUND OF THE INVENTION

1. Field of the Invention:

The present invention relates to molding compounds which contain a thermoplastically processible, aromatic polyamide.

2. Discussion of the Background:

Aromatic polyamides prepared from diamines of the general structure

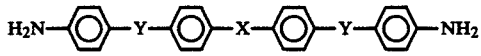

are well known (see, e.g., DE-OS No. 36 09 011). However, the melt viscosity of these aromatic polyamides is very high. Therefore, when they are prepared and processed, very high temperatures-in general at least 350° C. are required. At these temperatures decomposition is frequently observed in the product, as evidenced by discoloration or a deterioration in mechanical properties.

Another drawback is the sensitivity of these polyamides with respect to hydrolytic decomposition, which is caused by a high absorption of water. In order to prevent this hydrolysis, additional steps—such as drying—are required during processing.

Thus, there is a need for molding compounds based on aromatic polyamides which possess low melt viscosities and are thermoplastically processible.

There is a further need for aromatic polyamide molding compounds with increased resistance to hydrolysis.

SUMMARY OF THE INVENTION

Accordingly, one object of the present invention is to provide novel molding compounds based on aromatic polyamides, which possess low melt viscosities and are thermoplastically processible.

Another object of the present invention is to provide novel aromatic polyamide molding compounds with an increased resistance to hydrolysis.

These and other objects have been made possible by the inventors' discovery that aromatic polyamides which contain from 0.01 to 10 mole % of a low molecular weight, aliphatic, araliphatic, or aromatic carboxylic acid amide possess low melt viscosities and high resistances to hydrolysis.

DETAILED DESCRIPTION OF THE PREFERRED EMBODIMENTS

Thus, the molding compounds of the present invention contain aromatic polyamides which are prepared from the following starting materials:
(A) HOCC—Ar—COOH
(B) H$_2$N—Ar'—NH$_2$
(C) R'—CONH—R"
In the formulas given above, Ar denotes 1,3- or 1,4-phenylene, 1,4-, 1,5-, 2,6-, or 2,7-naphthylene,

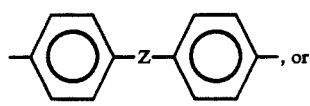, or

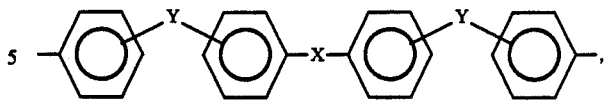

and
Ar' can be

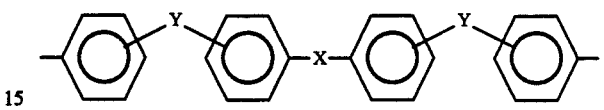

wherein
X is —SO$_2$—CO—; Y is —O— or —S—; Z is —O—, —S—, —SO$_2$—CO—, or —CR$_2$—, wherein R is —H or C$_1$-C$_4$-alkyl.
R' and R" can be the same or different and can be 1- or 2-naphthyl, C$_1$-C$_{20}$-alkyl, or

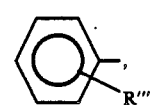

wherein R''' is —H, C$_1$-C$_4$-alkyl or halogen. Further, the polyamides of the present invention contain from 0.01 to 10 mole % of component (C), based on the sum of components (A) and (B).

Component (C) of the present invention is a low molecular weight, aliphatic, araliphatic or aromatic carboxylic acid amide. The aromatic group can be substituted by halogen or a C$_1$-C$_4$-alkyl group.

Preferred aliphatic carboxylic acid amides include acetic acid-N-ethylamide, butyric acid-N-ethylamide, butyric acid-N-decylamide, and propionic acid-N-octylamide. Benzoic acid-N-butylamide, toluic acid-N-butylamide, and butyric acid-N-phenylamide are preferred araliphatic carboxylic acid amides; benzanilide, 4-chlorobenzoic acid anilide, tolylanilide, benzoic acid N-(4,4'-phenoxy)diphenylsulfoneamide, and 2-naphthalene carboxylic acid anilide are preferred aromatic carboxylic acid amides.

In addition, it is also possible to prepare the low molecular weight carboxylic acid amides in situ by adding amide-forming compounds to the aromatic polyamide reaction mixture itself. In this process, the amide-forming compounds, such as carboxylic acids undergo a reaction with amines.

Preferred carboxylic acids are benzoic acid, naphthalene carboxylic acid, chlorobenzoic acid, and/or aliphatic carboxylic acids having 1-20 carbon atoms. Preferred amines include aniline, chloroaniline, naphthylamine, 4-(4-aminophenoxy)diphenylsulfone, and/or aliphatic amines having 4-20 carbon atoms. Preferably, the carboxylic acid and amine are added in equimolar quantities.

Suitable dicarboxylic acids for component (A) include isophthalic acid, terephthalic acid, 1,4-, 1,5-, 2,6-, and 2,7-naphthalenedicarboxylic acid, 4,4'-diphenyletherdicarboxylic acid, 4,4'-benzophenonedicarboxylic acid, 4,4'-diphenylsulfonedicarboxylic acid, 2-phenoxyterephthalic acid and mixtures thereof.

Suitable aromatic diamines for Component (B) are, e.g., 4,4'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4'-bis(p-aminophenylmercapto)benzophenone, 4,4'-bis(p-aminophenylmercapto)diphenylsulfone and mixtures thereof.

Isophthalic acid, 4,4'-bis(4-aminophenoxy)diphenylsulfone, and benzanilide are particularly preferred starting materials.

The molar ratio of Components (A) and (B) is approximately 1:1, and the polyamide contains from 0.01 to 10 mole % of Component (C), preferably 0.05 to 8 mole %, based on the sum of Components (A) and (B).

The polyamides of the present invention may be prepared by any suitable method for the preparation of polyamides such as that described, e.g., in DE-OS No. 36 09 011, which is incorporated herein by reference.

Preferably the carboxylic acid amide is mixed with the monomers (A) and (B). However, it is also possible to add Component (C) after the polycondensation is complete and the desired viscosity number has been reached.

In order to increase the molecular weight, the aromatic polyamides may be subjected to solid phase post condensation in an atmosphere of inert gas.

The glass temperatures (Tg) of the polyamides of the present invention range from 190° to 270° C., and the viscosity numbers (J values) range from approximately 30 to 90 cm$^3$/g, preferably from 60 to 80 cm$^3$/g.

The molding compounds may also contain fillers such as talcum; reinforcers, such as glass fibers, ARAMID ® fibers, or carbon fibers; and other conventional additives such as, e.g., pigments or stabilizers.

The polyamides of the present invention can be processed into the molding compounds of the present invention by means of injection molding or extrusion on conventional machines.

The molding compounds of the present invention are processed in accordance with the conventional methods such as injection molding, extrusion and the like into molded parts, fibers, films, etc. Similarly, it is possible to use a liquid dispersion or a solution as a coating agent starting with a powder in, e.g., a dip coating process.

The molding compounds of the present invention have excellent melt viscosities so that compared to the aromatic polyamide-containing molding compounds of the prior art, those of the present invention are more simply processed. In addition, the fact that the polyamides have a very good resistance to hydrolysis and, therefore, do not require any additional expensive measures to be taken against the effect of moisture during processing is surprising.

Other features of the present invention will become apparent in the course of the following descriptions of exemplary embodiments which are given for illustration of the invention and are not intended to be limiting thereof.

EXAMPLES

The parameters cited in the specification and in the Examples were determined by means of the following methods.

The differential scanning calorimetry examinations for determining the glass temperature (Tg) were conducted on a DSC-1B Perkin Elmer calorimeter at a heating rate of 16° K./min.

The viscosity numbers (J) were determined in compliance with DIN 53 728 with 0.5% by weight polymer solutions in a phenol/o-dichlorobenzene mixture (1:1 parts by weight).

The melt viscosity index (MVI) values were measured on a Gottfert viscometer at 320° C. and 21.6 kg load in compliance with DIN 53 735-MFI-B.

EXAMPLE 1

21.62 g (0.05 mole) of 4,4'-bis(4-aminophenoxy)diphenylsulfone, 8.31 g (0.05 mole) of isophthalic acid and 0.49 g (0.0025 mole) of benzanilide were melted with 155 mg (0.0005 mole) of triphenylphosphite and 61 mg (0.0005 mole) of 4-N,N-dimethylaminopyridine in a polycondensation reactor with a stirrer, nitrogen inlet tube and distillation bridge at 250° C. The temperature was increased after 20 minutes to 300° C. Simultaneously, the viscosity of the melt increased constantly, while the water that was liberated during the course of the reaction was removed by means of distillation. After 10 minutes, the temperature was increased to 320° C. and held there for 50 minutes.

The viscosity number (J) of the polyamide was 50 cm$^3$/g, and the melt viscosity index (MVI) was 15.4 cm$^3$/10 min.

COMPARATIVE EXAMPLE 1

21.62 g (0.05 mole) of 4,4'-bis(4-aminophenoxy)diphenylsulfone and 8.31 g (0.05 mole) of isophthalic acid were reacted with 155 mg (0.0005 mole) of triphenylphosphite and 61 mg (0.0005 mole) of 4-N,N-dimethylaminopyridine in the same manner as in Example 1. After only 30 minutes at 320° C. the mixture could no longer be stirred due to the extreme increase in melt viscosity. The viscosity number (J) was 98 cm$^3$/g. The melt viscosity index could not be measured due to the high melt viscosity.

EXAMPLE 2

21.62 g (0.05 mole) of 4,4'-bis(4-aminophenoxy)diphenylsulfone, 8.31 g (0.05 mole) of isophthalic acid and 1.00 g (0.005 mole) of benzanilide were reacted in the presence of 155 mg (0.0005 mole) of triphenylphosphite and 61 mg (0.0005 mole) of 4-N,N-dimethylaminopyridine in the same manner as in Example 1. The viscosity number (J) of the polyamide was 37 cm$^3$/g, and the melt viscosity index (MVI) was 173.5 cm$^3$/g.

EXAMPLE 3

21.62 g (0.05 mole) of 4,4'-bis(4-aminophenoxy)diphenylsulfone, 8.31 g (0.05 mole) of isophthalic acid and 0.64 g (0.0012 mole) of steric acid stearylamide were stirred with 155 mg (0.0005 mole) of triphenylphosphite and 61 mg (0.0005 mole) of 4-N,N-dimethylaminopyridine in the apparatus described in Example 1 for 20 minutes at 250° C., for 10 minutes at 300° C. and for 30 minutes at 320° C. The viscosity number (J) of the polyamide was determined to be 42 cm$^3$/g.

EXAMPLE 4

21.62 g (0.05 mole) of 4,4'-bis(4-aminophenoxy)diphenylsulfone, 8.31 g (0.05 mole) of isophthalic acid, 0.30 g (0.002 mole) of benzoic acid, and 0.23 g (0.0025 mole) of aniline were reacted with 155 mg (0.0005 mole) of triphenylphosphite and 61 mg (0.0005 mole) of 4-N,N-dimethylaminopyridine in the same manner as in Example 3. The viscosity number (J) of the polyamide was 66 cm$^3$/g.

Obviously, numerous modifications and variations of the present invention are possible in light of the above teachings. It is therefore to be understood that within the scope of the appended claims, the invention may be practiced otherwise than as specifically described herein.

What is new and desired to be secured by letters patent of the United States is:

1. A molding compound which comprises a thermoplastically processible aromatic polyamide which is prepared from the following starting materials:
   (A) HOOC—Ar—COOH
   (B) H$_2$N—Ar'—NH$_2$
   (C) R'—CONH—R"

wherein Ar is one member selected from the group consisting of 1,3-phenylene 1,4-phenylene, 1,4-naphthylene, 1,5-naphthylene, 2,6-naphthylene, 2,7-naphthylene,

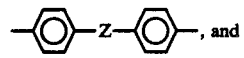, and

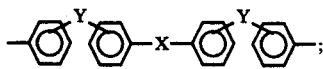;

Ar' is

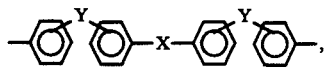, wherein
X is —SO$_2$ or —CO—,
Y is —O— or —S—,
Z is —O—, —S—, —SO$_2$—, —CO— or —CR$_2$—, and
R is —H or C$_1$ - C$_4$-alkyl; and
R' and R" are the same or different and are each one member selected from the group consisting of 1-naphthyl, 2-naphthyl, C$_1$ to C$_{20}$-alkyl, and

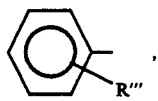, wherein R''' is —H, C$_1$–C$_4$-alkyl or halogen, and wherein said material (C) is present in an amount of from 0.01 to 10 mole % based on the sum of said materials (A) and (B).

2. The molding compound of claim 1, wherein Ar is 1,3-phenylene.

3. The molding compound of claim 1, wherein Ar' is

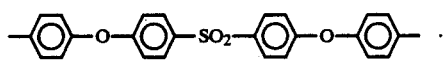.

4. The molding compound of claim 1, wherein R' and R" are each

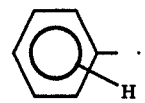.

5. The molding compound of claim 1, wherein said material (C) is present in an amount of from 0.5 to 8 mole % based on the total amount of said materials (A) and (B).

6. The molding compound of claim 1, which further comprises one or more members selected from the group consisting of fillers, reinforcers, pigments, and stabilizers.

7. The molding compound of claim 6, wherein said reinforcer is one member selected from the group consisting of glass fibers, aromatic polyamide fibers, and carbon fibers.

8. The molding compound of claim 1, wherein said thermoplastically processible aromatic polyamide is prepared by polymerizing said materials (A) and (B) in the presence of said material (C).

9. The molding compound of claim 8, wherein said material (C) is prepared in situ from a carboxylic acid and an amide in said polymerizing.

10. The molding compound of claim 9, wherein said carboxylic acid is one or more members selected from the group consisting of benzoic acid, naphthalene carboxylic acid, chlorobenzoic acid and C$_1$–C$_{20}$ aliphatic carboxylic acids.

11. The molding compound of claim 9, wherein said amine is one or more members selected from the group consisting of aniline, chloroaniline, naphthylamine, 4-(4-aminophenoxy)diphenylsulfone, and C$_4$–C$_{20}$ aliphatic amines.

12. The molding compound of claim 9, wherein said carboxylic acid and said amine are added in equimolar amounts.

13. The molding compound of claim 1, wherein said thermoplastically polyamide is prepared by first polymerizing said materials (A) and (B) and then adding said material (C).

14. The molding compound of claim 1, wherein said material (A) is at least one member selected from the group consisting of isophthalic acid, terephthalic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-diphenyletherdicarboxylic acid, 4,4'-benzophenonedicarboxylic acid, 4,4'-diphenylsulfonedicarboxylic acid, and 2-phenoxyterephthalic acid.

15. The molding compound of claim 1, wherein said material (B) is at least one member selected from the group consisting of 4,4'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy) benzophenone, 4,4'-bis(p-aminophenylmercapto) benzophenone, and 4,4'-bis(p-aminophenylmercapto)diphenylsulfone.

* * * * *